US006250497B1

(12) United States Patent
Pearson et al.

(10) Patent No.: US 6,250,497 B1
(45) Date of Patent: Jun. 26, 2001

(54) MEDICATION DISPENSING SYSTEM

(75) Inventors: Walter G. Pearson, Pineville; Dennis J. Murdock, Dry Prong, both of LA (US)

(73) Assignee: Pearson Ventures, LLC, Alexandria, LA (US)

( * ) Notice: Subject to any disclaimer, the term of this patent is extended or adjusted under 35 U.S.C. 154(b) by 0 days.

(21) Appl. No.: 09/638,526

(22) Filed: Aug. 11, 2000

(51) Int. Cl.[7] .......... B23Q 7/12
(52) U.S. Cl. .......... 221/164; 221/192
(58) Field of Search .......... 221/2, 7, 9, 13, 221/156, 163, 164, 165, 166, 191, 192, 194, 268, 278

(56) References Cited

U.S. PATENT DOCUMENTS

| | | | |
|---|---|---|---|
| 2,636,432 | 4/1953 | Sherer . | |
| 3,057,473 | 10/1962 | Stern et al. . | |
| 3,333,731 | 8/1967 | Katz . | |
| 3,362,530 | 1/1968 | Johnson . | |
| 3,721,339 | 3/1973 | Seyer | 206/65 |
| 3,737,026 | 6/1973 | Whitecar | 206/42 |
| 4,113,143 | 9/1978 | Spagnola, Jr. | 221/267 |
| 4,465,186 | 8/1984 | Meyers | 206/342 |
| 4,527,689 | 7/1985 | Meyers | 206/342 |
| 4,635,795 | 1/1987 | DeFlander et al. | 206/526 |
| 4,817,818 | 4/1989 | Lockhart | 221/1 |
| 4,978,012 | 12/1990 | Meyers | 221/49.1 |
| 5,014,878 | 5/1991 | Janz | 221/279 |
| 5,181,189 | 1/1993 | Hafner | 368/10 |
| 5,181,460 | 1/1993 | Gremelsbacker | 100/34 |
| 5,197,632 | 3/1993 | Kaufman et al. | 221/197 |
| 5,221,005 | 6/1993 | Hayward | 206/334 |
| 5,292,029 | 3/1994 | Pearson | 221/2 |
| 5,335,816 | 8/1994 | Kaufman et al. | 221/13 |
| 5,447,229 | 9/1995 | Lynch et al. | 206/706 |
| 5,458,952 | 10/1995 | Wagner et al. | 428/192 |
| 5,558,248 * | 9/1996 | Sokada | 221/164 |
| 5,752,620 | 5/1998 | Pearson | 221/2 |
| 5,927,545 | 7/1999 | Pearson | 221/197 |

* cited by examiner

*Primary Examiner*—Kenneth W. Noland
(74) *Attorney, Agent, or Firm*—Roy, Kiesel & Tucker

(57) ABSTRACT

A pill dispensing system which includes a container constructed to old a plurality of pills and that container includes a lower aperture and an upper portion. A pill lifting assembly located below the pill container includes a pill platform which lifts a pill into the upper portion of the container. A pill ejector is connected to the pill platform and the pill ejector places the pill into motion as the pill platform approaches the upper portion of the container. An exit passage communicates with the upper portion of the pill container and the exit passage is configured to receive a pill placed into motion by the ejector. A sensor is operatively connected to the exit passage such that the sensor is capable of detecting a pill moving through the exit passage. Finally, a micro-controller is operatively connected to the pill lifting assembly and the sensor. This micro-controller accepts an input representing the number of pills to be dispensed and initiates sufficient cycles of the pill lifting assembly to insure the desired number of pills are dispensed.

15 Claims, 16 Drawing Sheets

Figure 10 Program Flow Chart

Pill Front Tape
Back Tape
Rubber Stop
Heated Jaws
Cutting Tip
Motion in this direction
Motion in this direction
Platter
Platter
Pill
Pill
Pill
140
143
144
146
147
148
149
150
151
152
85

MEDICATION DISPENSING SYSTEM

BACKGROUND OF INVENTION

The present invention relates to devices for dispensing medications in pill or tablet form. More particularly, the present invention relates to fully automated medication dispensers which are capable of dispensing a predetermined number of pills or tablets.

U.S. Pat. No. 5,752,620 to Walter Pearson illustrates one type of pill dispenser found in the prior art. This patent discloses a stationary tube which is positioned in a movable pill container. At the top of the container is an exit passage. The pill container is pushed downward leaving a pill on the top of the tube and positioning the top of the tube near the exit passage. Pressurize air is used to propel the pill off the end of the tube and into the exit passage. It would be advantageous to provide a pill dispenser that did not require the movement of such a large component as the pill container. Additionally, the drawings in the Pearson patent illustrate a device which is powered by springs and mechanical tension on draw cords. It also would be advantageous to have a pill dispenser which is motorized, allowing for easier electronic control.

SUMMARY OF THE INVENTION

The present invention provides a pill dispensing system. The system includes a container constructed to hold a plurality of pills and that container includes a lower aperture and an upper portion. A pill lifting assembly located below the pill container includes a pill platform which lifts a pill into the upper portion of the container. A pill ejector is connected to the pill platform and the pill ejector places the pill into motion as the pill platform approaches the upper portion of the container. An exit passage communicates with the upper portion of the pill container and the exit passage is configured to receive a pill placed into motion by the ejector. A sensor is operatively connected to the exit passage such that the sensor is capable of detecting a pill moving through the exit passage. Finally, a micro-controller is operatively connected to the pill lifting assembly and the sensor. This micro-controller accepts an input representing the number of pills to be dispensed and initiates sufficient cycles of the pill lifting assembly to insure the desired number of pills are dispensed.

DETAILED DESCRIPTION OF THE INVENTION

Figure 1:
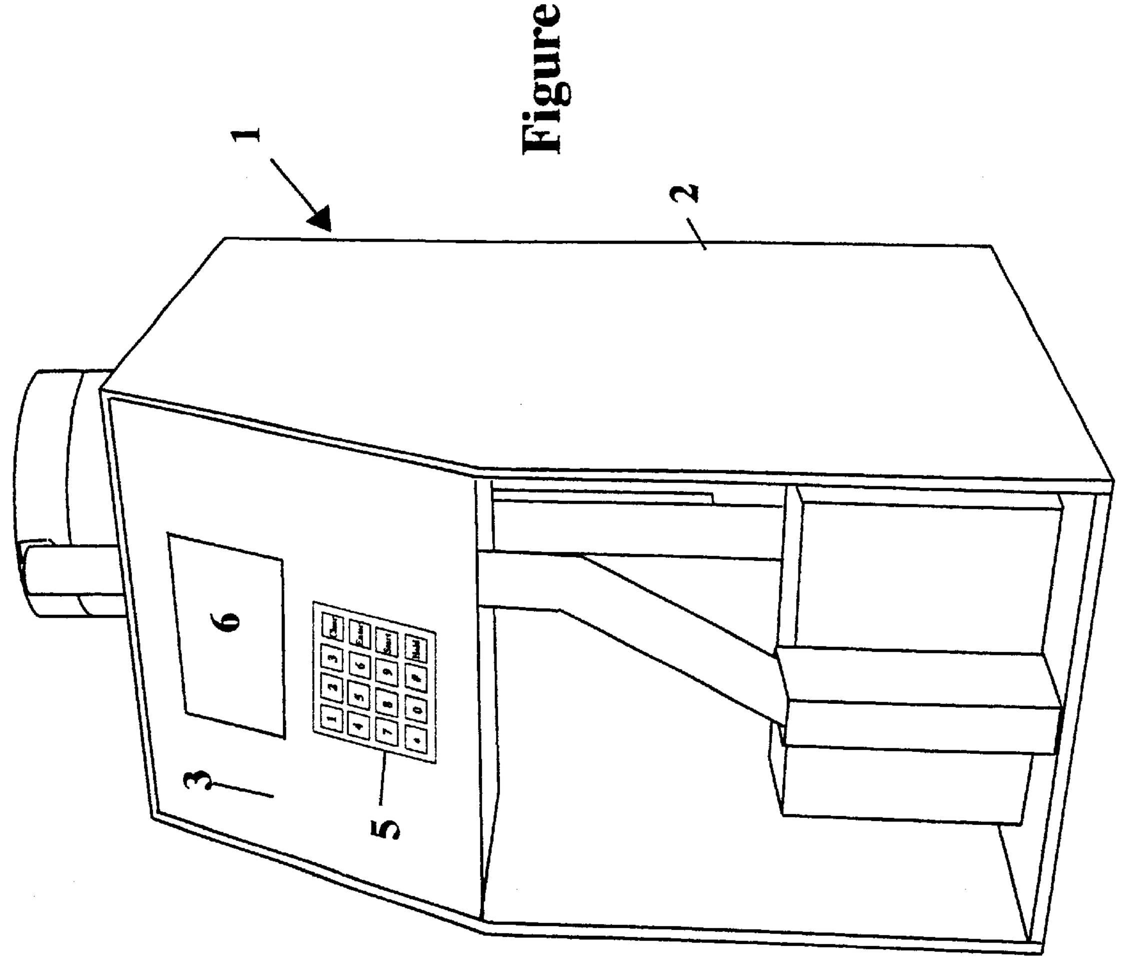
FIG. 1 is a front view of the automated pill dispenser of the present invention showing a front bottom panel removed.
Figure 2:
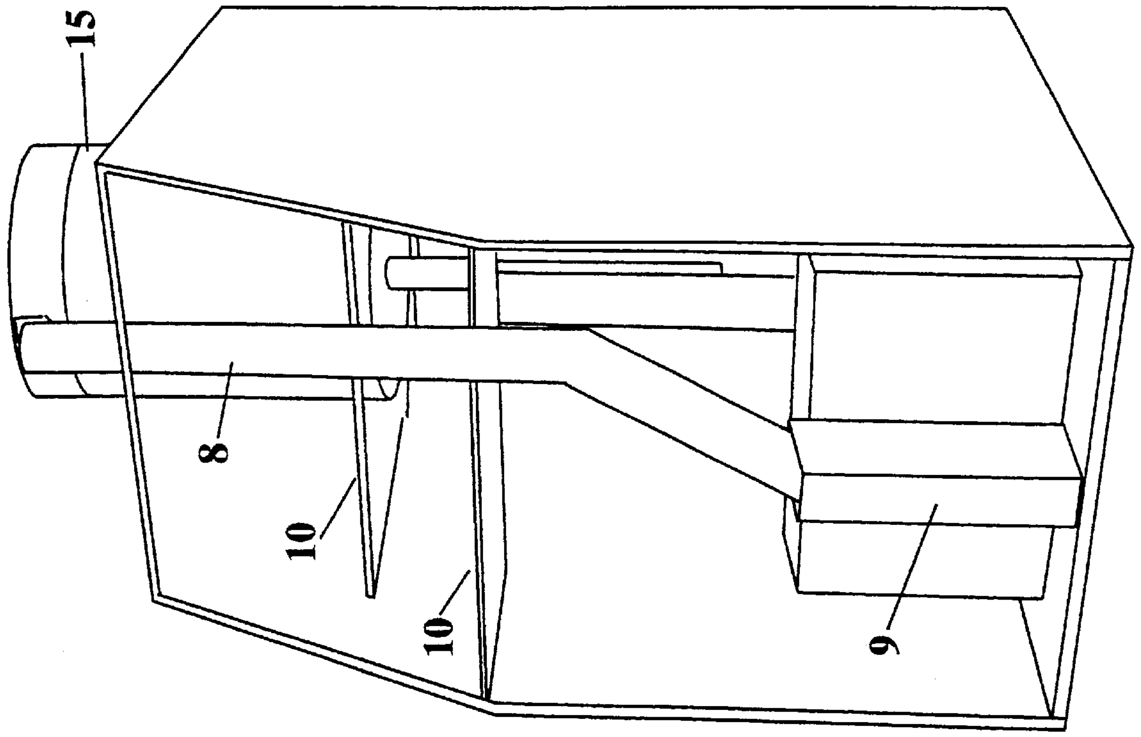
FIG. 2 is a front view of the automated pill dispenser of the present invention showing both the top and bottom front panels removed.

FIG. 1 illustrates one embodiment of the present invention, pill dispenser 1. FIG. 1 shows dispenser-housing 2 with a bottom front panel removed and top front panel 3 in place. FIG. 1 indicates how panel 3 will have mounted thereon an LCD display 6 and a keypad 5 which are used for inputting instructions to pill dispenser 1 as is explained in more detail below. FIG. 2 shows panel 3 removed in order to illustrate how planer supports 10 act to hold in place various internal components of pill dispenser 1. FIG. 2 also shows pill bowl 15, pill tube 8 and drop chamber 9, all of which are explained in detail below.

Figure 3:
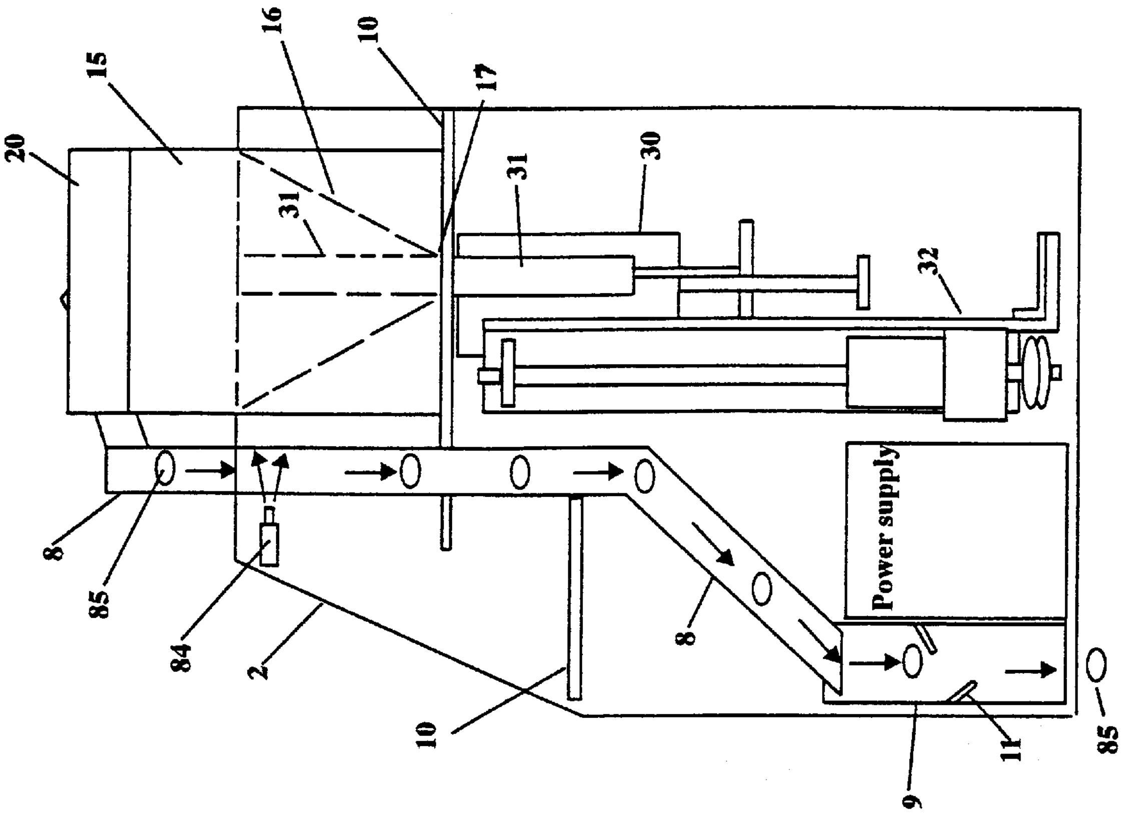
FIG. 3 is a side view of the automated pill dispenser of the present invention showing the side panel removed.
Figure 4A:
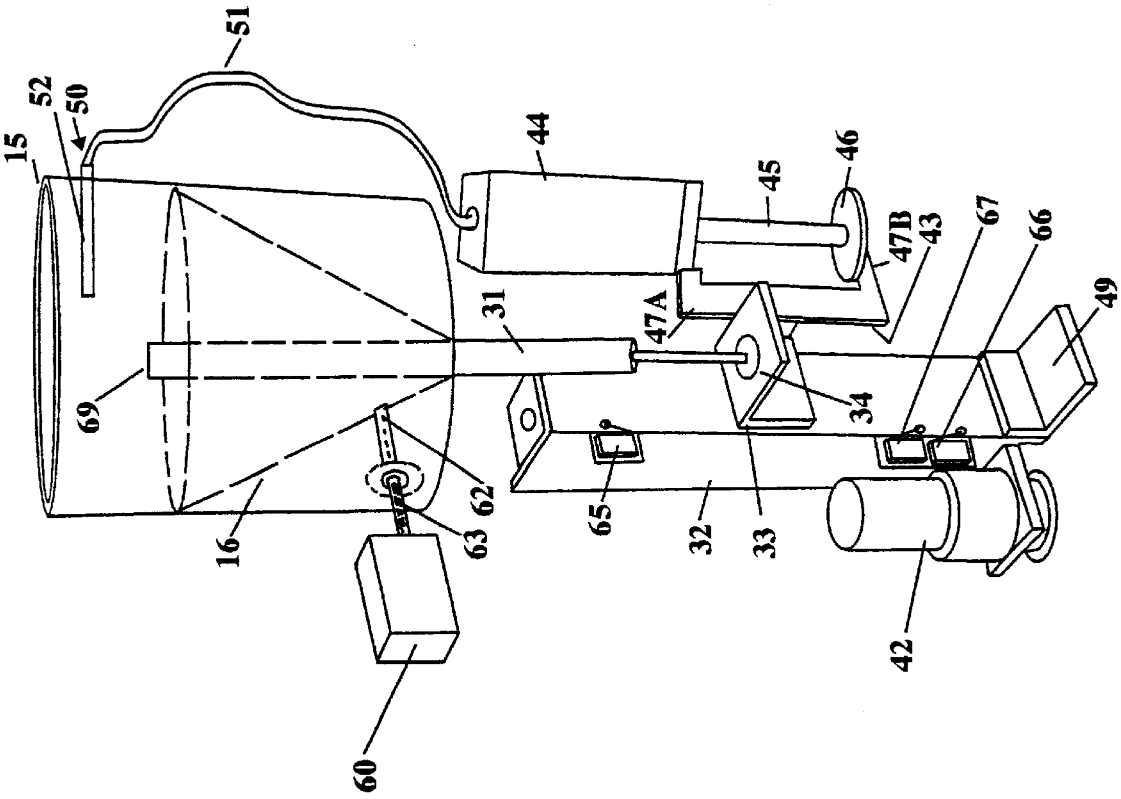
FIGS. 4*a* and 4*b* are perspective views of one embodiment of the pill lifting assembly of the present invention.

The side view of FIG. 3 provides a more detailed view of the internal components of pill dispenser 1. Pill bowl 15 will be positioned on a planer support 10 and a pill cap 20 will rest on bowl 15. Pill bowl 15 will include a pill hopper 16 which directs pills or tablets toward the bottom center of hopper 16. While not clearly seen in FIG. 3, it will be understood that an aperture 17 is formed through support 10 and into hopper 16 and allows pill rod 31 to travel inside of hopper 16. Pill rod 31 is part of pill lifting assembly 30 which is held in place within housing 2 by lift assembly frame 32. FIG. 4*a* is a perspective view of pill lifting assembly 30 removed from housing 2 and seen as it would be from the back of housing 2. It will be understood that pill bowl 15 is not fixed pill rod 31, but rather bowl 15 simply rests on a support 10 which is not shown in FIG. 4. Frame 32 has a footing 49 which will securely fix frame 32 within housing 2 by way of any conventional means such as bolts, screws or the like. Pill rod 31 is positioned upon flange 34 which forms part of traveling block 33. Traveling block 33 is best seen in FIG. 5, which shows pill lifting assembly 30 rotated approximately 180 degrees from FIG. 4. Traveling block 33 moves up and down frame 32 by way of worm gear 36. Worm gear 36 is essentially a coarsely threaded member which is positioned between a top mounting platform 37 and a bottom-mounting platform 38. While not shown, the ends of worm gear 36 will have pins which fit in apertures 48 (see top platform 37) of both mounting platforms 37 and 38. This configuration allows worm gear 36 to rotate freely between mounting platforms 37 and 38. The pin connecting worm gear 36 to bottom mounting platform 38 will extend through platform 38 and connect to pulley 40 such that rotation of pulley 40 will rotate worm gear 36. Motor 42 is also positioned on bottom platform 38 and is configured to supply torque to another pulley 39 position below platform

38. A belt 41 connects pulleys 40 and 39 such that torque is supplied to worm gear 36 by motor 42. It will be understood that the passage in block 33 through which worm gear 36 extends is a threaded passage. Thus, when motor 42 turns worm gear 36, traveling block 33 moves upwards (worm gear 36 turning counterclockwise) or downwards (worm gear 36 turning clockwise). A guide rail 35 is attached to frame 32 and engages a guide channel in traveling block 33 to help stabilize block 33.

Returning to FIG. 4*a*, it will be understood that since flange 34 forms part of traveling block 33, flange 34 will move up and down support frame 32 with block 33. Also attached to traveling with block 33 is fork 43. Fork 43 will have an upper prong 47*a* and a lower prong 47*b*. The purpose of fork 43 is to activate air pump 44. While not shown, it will be understood that a pump 44 is secured to housing 2 and does not move relative to frame 32. Pump piston rod 45 extends from pump 44 and has a rod footing 46 fixed on its end. When fork 43 moves upward with traveling block 33, prong 47*b* will push footing 46 and piston rod 45 upward, forcing compressed air through hose 51 (for reasons explained below). Downward movement of fork 43 allows prong 47*a* to catch footing 46 and pull piston 45 downward, thereby preparing pump 44 to deliver additional air on the next upward cycle of traveling block 33.

Figure 4B:
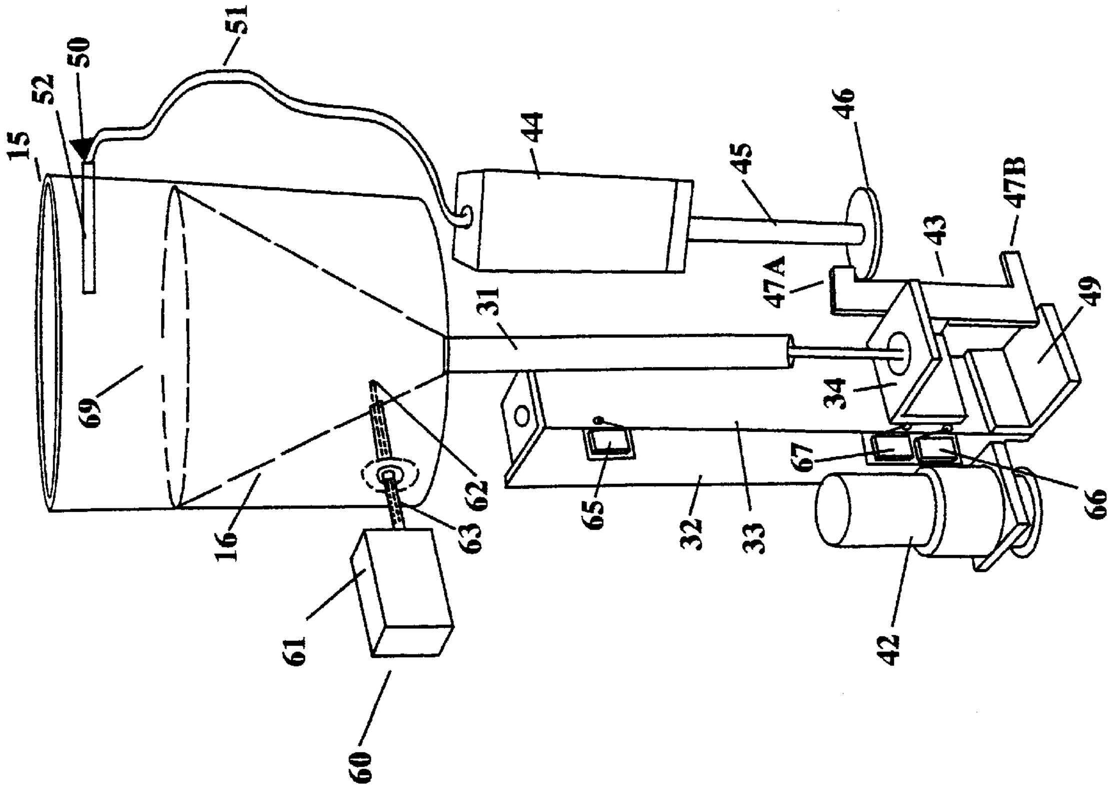
Figure 5:
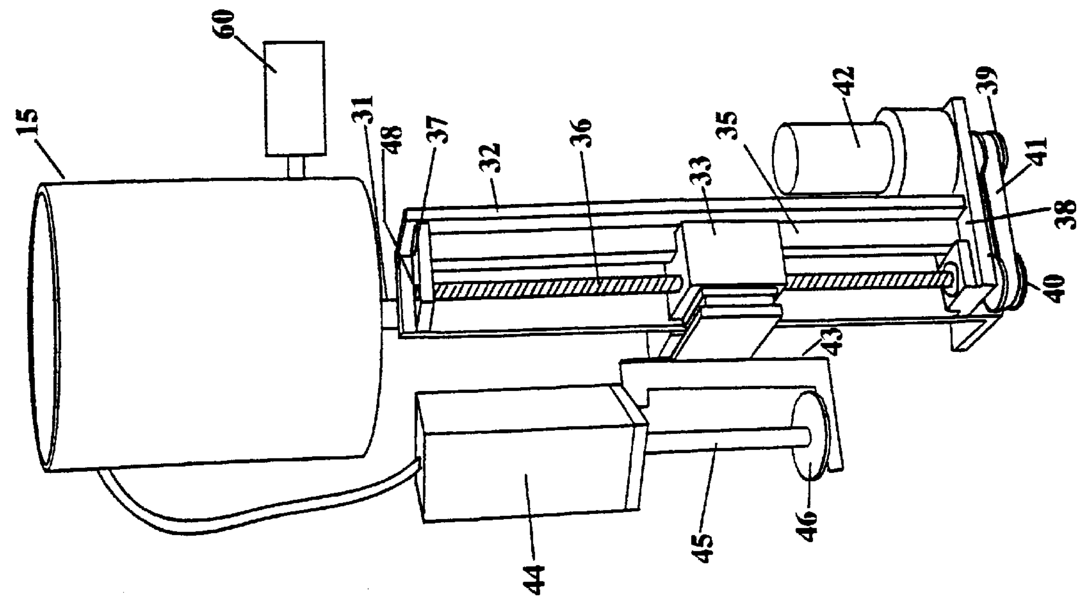
FIG. 5 is similar to FIG. 4, but illustrates the pill lifting assembly rotated approximately 180 degrees from the view of FIG. 4.

Still viewing FIG. 4, one of the primary functions of traveling block 33 is to move pill rod 31 up and down within pill bowl 15. The top of pill rod 31 will form a pill platform 69 upon which pills in hopper 16 will rest. The bottom limit of travel for block 33 (and thus pill rod 31) will place pill platform 69 at the very bottom of hopper 16 as seen in FIG. 4*b*. This will submerge pill platform 69 in the quantity of pills placed in hopper 16. When traveling block 33 moves upward, it will raise pill platform 69 through the quantity of pill (retain one pill on top of platform 69) and position pill platform 69 in the upper portion of pill bowl 15. To explain the subsequent removal of the pill on platform 69 from bowl 15, reference is made to FIGS. 6–8.

Figures 6, 6A, 6B:
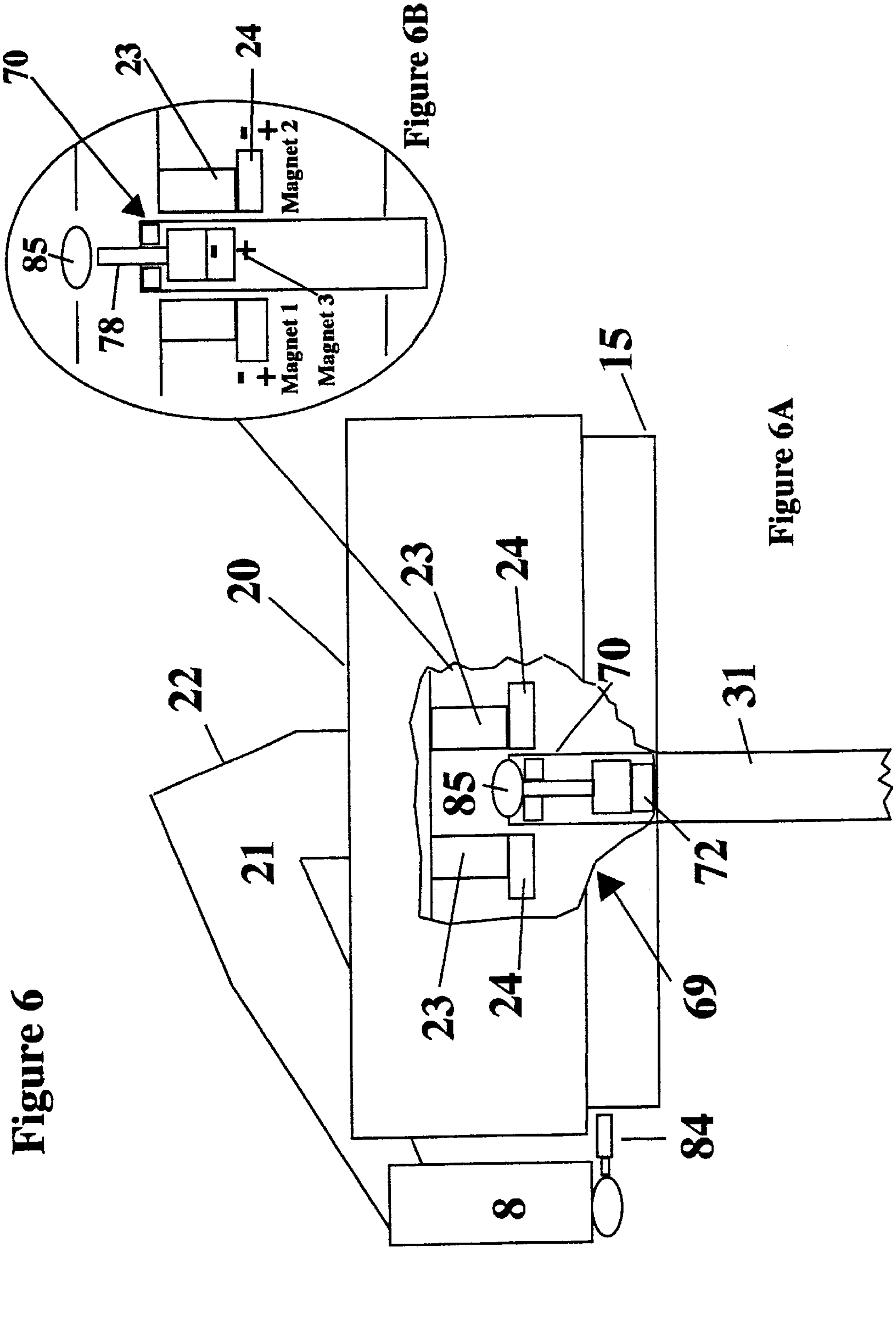
FIGS. 6*a* and 6*b* are side views of the pill dispenser cap and a partial cutaway view of one embodiment of the pill ejector of the present invention.
Figure 7:
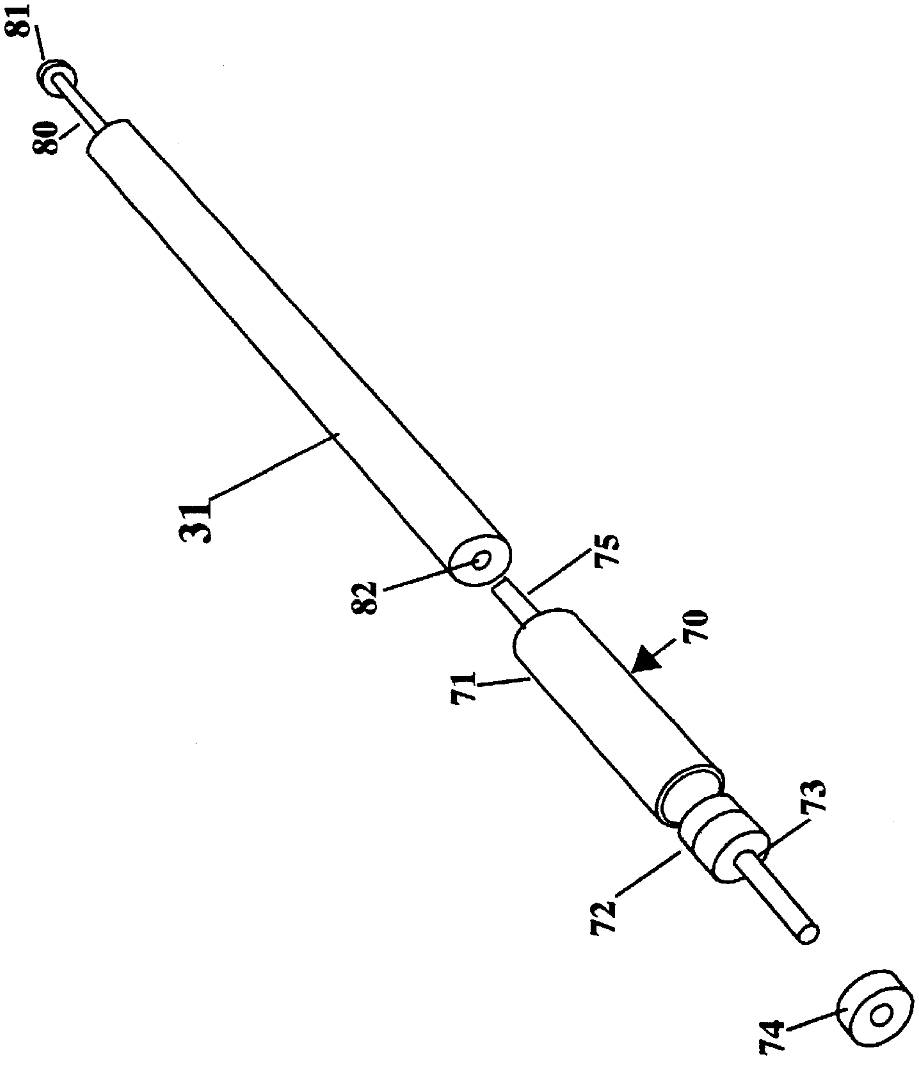
FIG. 7 is a perspective view of one embodiment of the pill-lifting rod of the present invention.
Figures 8, 8A, 8B, 8C, 8D:
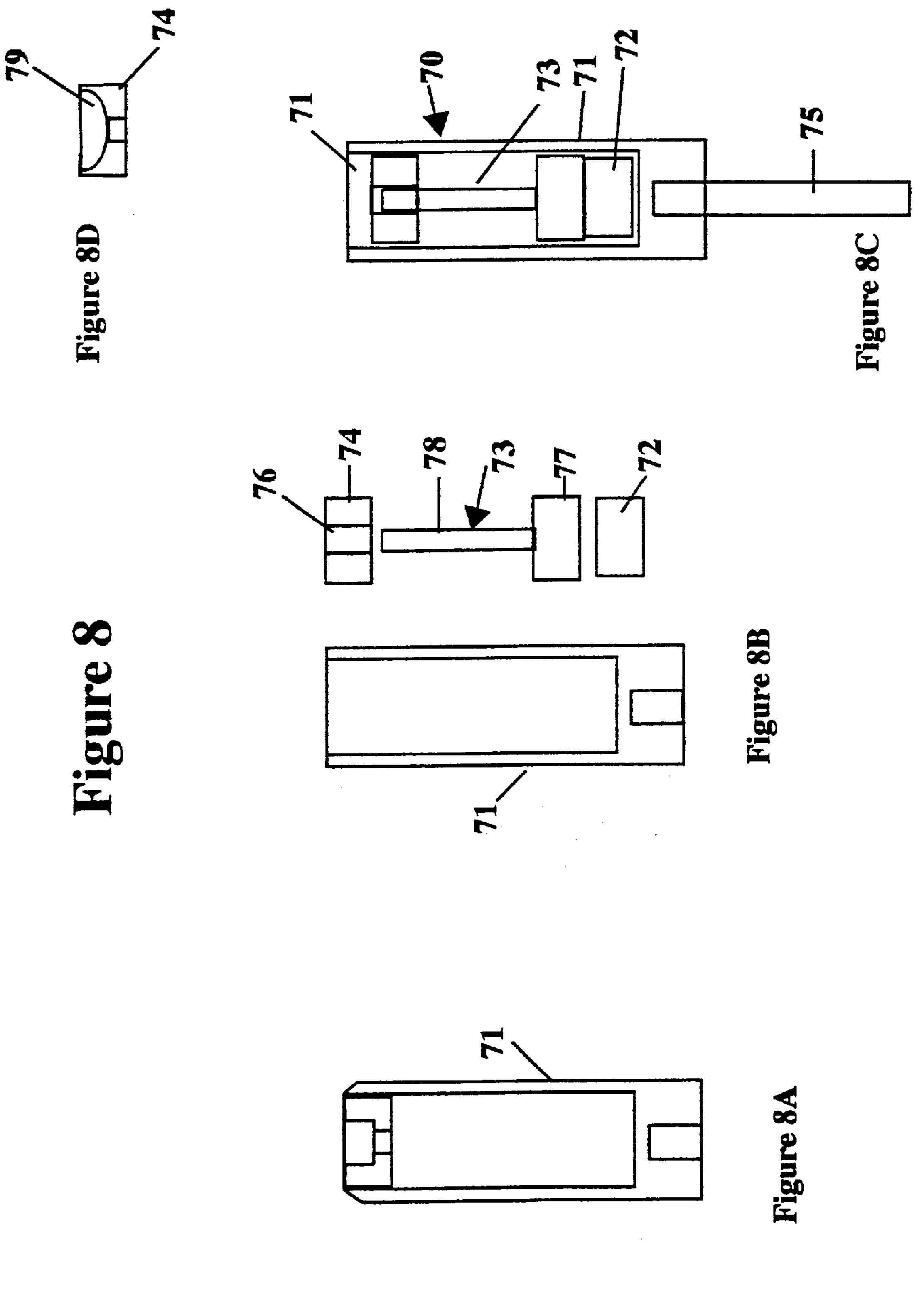
FIGS. 8*a*–8*d* are detailed views of the pill ejector seen in FIG. 6.

FIG. 7 shows an exploded view of pill rod 31 and an ejector assembly 70, which comprise part of pill platform 69. Pill rod 31 will have a threaded lower end 80 which will connect to flange 34 (as seen in FIG. 4*a*) by any conventional means such as nut 81. The upper end of pill rod 31 will have an aperture 82 into which a threaded section 75 of ejector assembly housing 71 may be screwed. Ejector assembly 70 will generally comprise hollow cylindrical housing 71, plunger 73 and plug 74. FIG. 8c generally shows how plunger 73 is positioned within housing 71 with plug 74 snuggly fitting within housing 71 and preventing the escape of plunger 73 from housing 71. Of course, alternatively to the friction fit seen in FIG. 8*c*, plug 74 could be glued into place or threaded into housing 71. As seen in FIG. 8*b*, plunger 73 will have a plunger base 77 with a plunger rod 78 extend upward therefrom. An aperture 76 will be formed in plug 74 which is sized to allow plunger rod 78 to extend through aperture 76. The top of plug 74 may be shaped to retain different sized pills. For example, the plug 74 seen in FIG. 8*b* would be for smaller pills which could partially rest in aperture 76, while the plug 74 seen in FIG. 8*d* could be somewhat beveled to form a pill cup 79 which would hold larger pills. Fixed to the bottom of plunger base 77 will be a magnet 72. This magnet will serve as the driving force of ejector assembly 70 as best seen in FIG. 6*a* and 6*b*. FIG. 6*a* shows the upper portion of pill bowl 15 with cap 20 positioned thereon. Communicating with bowl 15 through cap 20 is exit passage 21 and exit passage 21 in turn transforms into pill tube 8. Extending downward from cap 20 are two supports 23 which bracket the path pill platform 69 takes on its course to the upper limit of its movement. A magnet 24 is positioned on each support 23. The polarity of magnets 24 and 72 are shown in FIG. 6*b*. As pill rod 31 is raised and pill ejector 70 approaches magnets 24 (as seen in FIG. 6*a*), there is no net magnetic attraction-urging magnet 72 to move. However, as pill rod 31 reaches the upper limit of its travel (as seen in FIG. 6*b*), the net force directed by magnets 24 on magnet 72 causes magnet 72 to move upward very quickly. This, of course, causes plunger rod 78 to move upward very quickly, pushing pill 85 upward rapidly enough for pill 85 to become airborne and enter exit passage 21. Viewing FIG. 6*a*, it is expected that pill 85 will impact the angled deflecting surface 22 and bounce down exit passage 21 and into pill tube 8. As pill 85 passes down pill tube 8, it will pass sensor 84 which generates a signal in response to the passage of pill 85. In the embodiment shown, sensor 84 is an IR reflective sensor such as made by Digi-Key Corporation, 701 Brooks Ave. South, Thief River Falls, Minn. 56701-0677.

Summarizing the above operation of pill dispenser 1 in view of FIGS. 4*a* and 4*b*, it can be presumed that the starting position of pill rod 31 will be a point where pill platform 69 is at the bottom of hopper 16 as in FIG. 4*b*. Motor 42 will be activated, rotating worm gear 36 (see FIG. 5) and forcing pill rod 31 to move upward with traveling block 33 as seen in FIG. 4*a*. As pill platform 69 moves through the quantity of pills in hopper 16, at least one pill should remain on platform 69, especially if pill platform 62 includes a pill cup 79 as seen in FIG. 8*d*. As traveling block 33 moves upward, it will cause pump piston 45 to move into pump 44. This will force compressed air through hose 51 and cause the comparatively high-pressure air to exit rigid extension tube 52. Tube 52 will project outward near the path of pill platform 69, but will not interfere with the travel of pill platform 69. However, tube 52 will blow air of sufficient force across pill platform 69 such that pills other than a single pill in pill cup 79 will be blown off of pill platform 69. In this manner, pump 44 sending air through tube 52 acts as a "pill sweep" to sweep off any excess pills (i.e. more than one pill) balanced on pill platform 69. This insures that only a single pill is ejected into exit passage 21 per cycle of pill rod 31. As just described, when magnet 72 in ejector assembly 70 passes magnets 24, a pill 85 will be lifted into exit passage 21. The upward movement of pill rod 31 will cease upon flange 34 contacting switch 65. Upon activation of switch 65, the direction of motor 42 will be reversed, causing traveling block 33 to begin moving downward. Block 33 will continue its downward movement until flange 34 contacts switch 66 as seen in FIG. 4*b*. This switch stops the operation of motor 42, but also again reverses the direction of the motor 42 so that block 33 will be situated to begin another cycle when motor 42 is restarted. It can be seen in FIG. 4 that before flange 34 activates switch 66 and stops motor 2, flange 34 will activate a third switch 67. The purpose of switch 67 is to activate agitator 60 which will agitate the pills in hopper 16 and help insure that a pill is positioned over pill platform 69 when pill rod 31 begins its next cycle. In the embodiment of FIGS. 4*a* and 4*b*, agitator 60 comprises solenoid 61 connected to hopper 16 by wave of rod sleeve 63. Attached to solenoid 61 is an agitator rod 62 which communicates through sleeve 63 into hopper 16. Normally, agitator rod 62 is retracted into sleeve 63 (see FIG. 4*a*) and does not extend into hopper 16. However, by the time flange 34 contacts switch 67, the top of pill platform 69 will be at the bottom of hopper 16 (below sleeve 63). At this point, the contacting of switch 67 causes solenoid 61 to activate and agitator rod 62 to protrude out of sleeve 63, into hopper 16 and thereby agitate pills within hopper 16 as seen in FIG. 4*b*.

Figure 9:
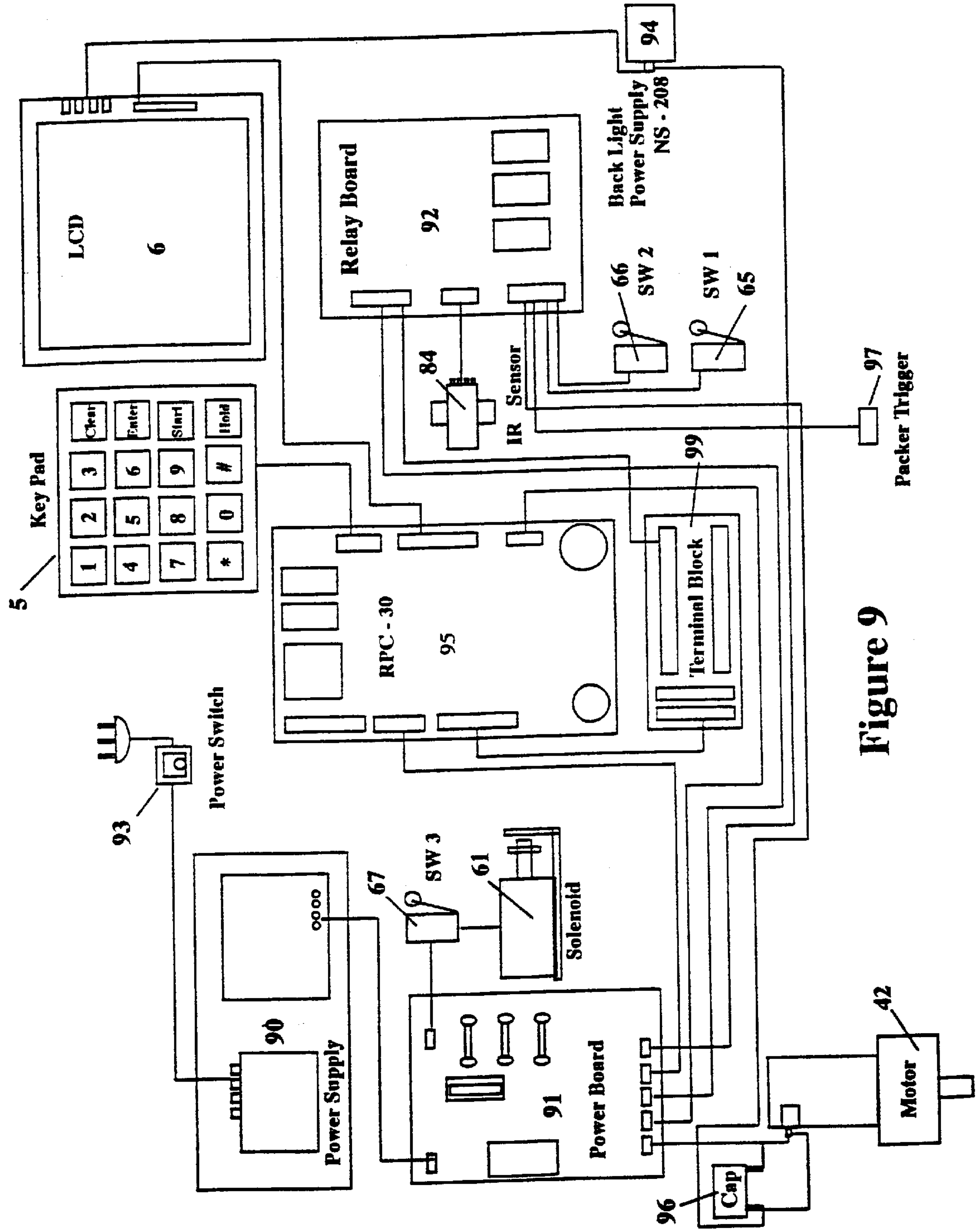
FIG. 9 is a schematic of the control electronics used in the disclosed pill dispenser.

While the foregoing describes the basic mechanical features required to cycle pill rod 31, the control of the motor 42 (and thus the raising and lowering of pill rod 31) will be carried out by certain electronic circuitry. FIG. 9 discloses schematic of the electronic components and how they interrelate to one another. Power supply 90 will receive standard 110-volt ac source and convert this source into a 24-volt dc supply. The 24-volt dc power will be fed into power board 91 which will provide various voltages between 24 and 5 volts to those components requiring such voltages. For example, motor 24 and solenoid 61 will require 24 volts, relay board will require 12 volts, and micro-controller or microprocessor 95 will require 5 volts. In the embodiment shown, microprocessor 95 is a model RPC-30 provided by Remote Processing, Inc., located at 7975 E. Harvard Blvd., Denver, Colo. However, a wide variety of microprocessors could perform the functions described herein. Nor is the micro-controller necessarily limited to a microprocessor, but could include complex "hard wired" logic circuitry. Numerous components seen in FIG. 9 will send and receive signals from microprocessor 95. For example, keypad 5 sends signals to microprocessor 95 while LCD 6 receives signals reflecting information to be displayed. Through relay board 92, microprocessor 95 will receive signals from IR sensor 84 and signals indicating the status of switches 65 and 6. Microprocessor 95 will also signal relay board 92 to provide power to motor 42. Relay board 92 will provide relay circuits for performing certain functions, like switching the polarity (and thus direction) to motor 42 when switch 65 or 66 is activated. Other components which will be readily recognized by those skilled in the art and need no further explanation are power switch 93, 1 uF capacitor 96 (to filter spikes in motor supply), LCD back light power supply 94, and terminal block 99 which acts as a junction point for wires from various components and the pins of microprocessor 95. It will be understood that the embodiment of pill dispenser 1 seen in the figures carries the circuitry of FIG. 9 "onboard" or within housing 2.

Figure 10:
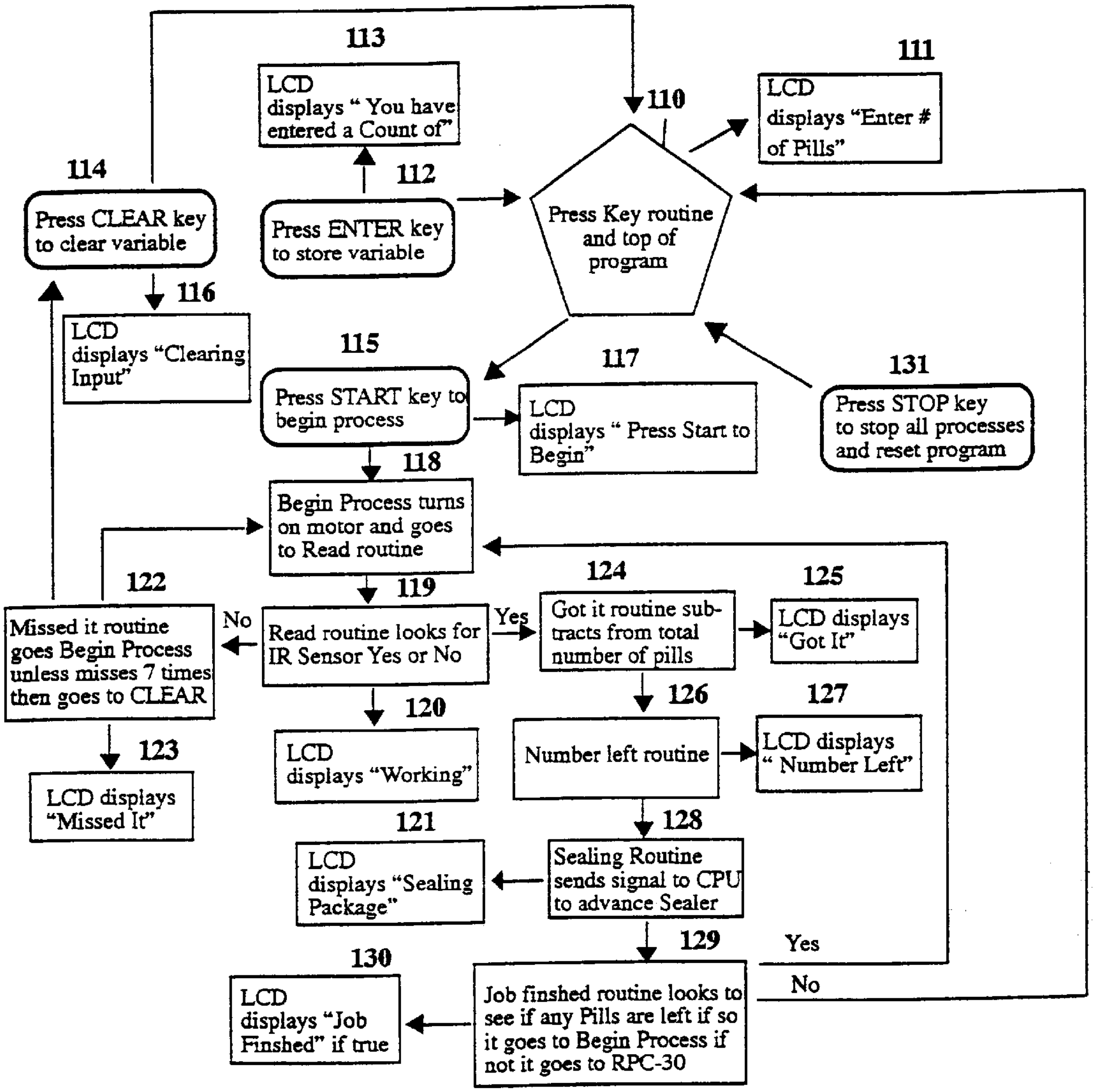
FIG. 10 is a flow illustrating the functional steps a control code would implement in the disclosed pill dispenser.

The microprocessor 95 seen in FIG. 9 will be programmed to carry out the functions described in the program flow chart seen in FIG. 10. Block 110 represents the microprocessor reading instructions at the top of the program. When powered up, block 110 will cause the execution of step 111 which request entry of the number of pills to be dispensed. After the number of pills has been specified on keypad 5 and the ENTER key pressed as in step 112, the number of pills will be stored in memory and that number displayed on LCD 6 as per step 113. Step 117 has the LCD prompt the user to press the START key and this will initiate the process as indicated in step 115. Step 118 shows how the motor will be started and the program advanced to the READ routine of step 119. Step 119 queries whether the IR sensor has sent a signal indicating a pill has passed the sensor. If no, step 122 starts a MISSED IT routine and displays a miss message while returning to step 118. If the program is returned to step 118 seven times without the sensor indicating a pill has passed, it is assumed that the pill hopper is out of pills and the program returns to step 114 and then back to the top of the program at block 110. When step 119 registers that a pill has passed the sensor, a GOT IT routine in step 124 subtracts 1 from the total number of pills and displays a "got it" message. The program then enters a NUMBER LEFT routine (step 126) which displays the number of pills left to be dispensed. Step 128 provides the signal to advance the sealer (i.e. the pill packaging device explained below) and then advances to step 129. This step evaluates whether there are any pills left in the original count which should be dispensed. If there are pills left, step 129 returns the program to beginning step 118 where the above-described process is restarted. If there are no pills left to be dispensed, step 129 returns the program to block 110 to await input of another pill count by the user.

While not shown in the drawings and not part of the present invention, it will be understood that pill dispenser 1 will normally work in conjunction with a conventional pill packaging device or "sealer." The sealer will normally have a moving series of pill packages on some type of conveyer which will advance the pill package to a point that the open end of the pill package is positioned beneath drop chamber 9 (see FIGS. 2 and 3). One such sealer is the Small Pack model 13 manufactured by Odessa Packaging located at 202 N. Bassett Street, Clayton, Del. FIG. 3 shows how drop chamber 9 includes at least one pill baffle 11 with 2 baffles being shown in that Figure. Baffles 11 will act to slow the travel speed of pills 85 exiting drop chamber 9. If pills 85 are not slowed, they have the potential to damage the pill packaging or knock the pill packages within the sealer out of proper alignment. The program illustrated in FIG. 10 envisions a sealer which accepts one pill per package and then advances the sealer in order to move another package under drop chamber 9. This is the function of step 128 which instructs microprocessor 95 to send a signal advancing the sealer before another pill is sent to drop chamber 9. The electrical connections for carrying out this function are illustrated in FIG. 9, where packer trigger 97 is shown connected to relay board 92.

While the above description illustrates a pill dispenser 1 which places a single pill in a package, the microprocessor code could readily be modified to place any number of pills in a package. Moreover, pill dispenser 1 could also be modified to accommodate sealers which provide double packages. For example, the company Odessa Packaging identified above also produces a sealer which simultaneously packages two pills. This sealer sold by Odessa Packaging is designated as the Model 14 and its operating principles are described below in conjunction with FIGS. 13 and 14.

Figure 11:
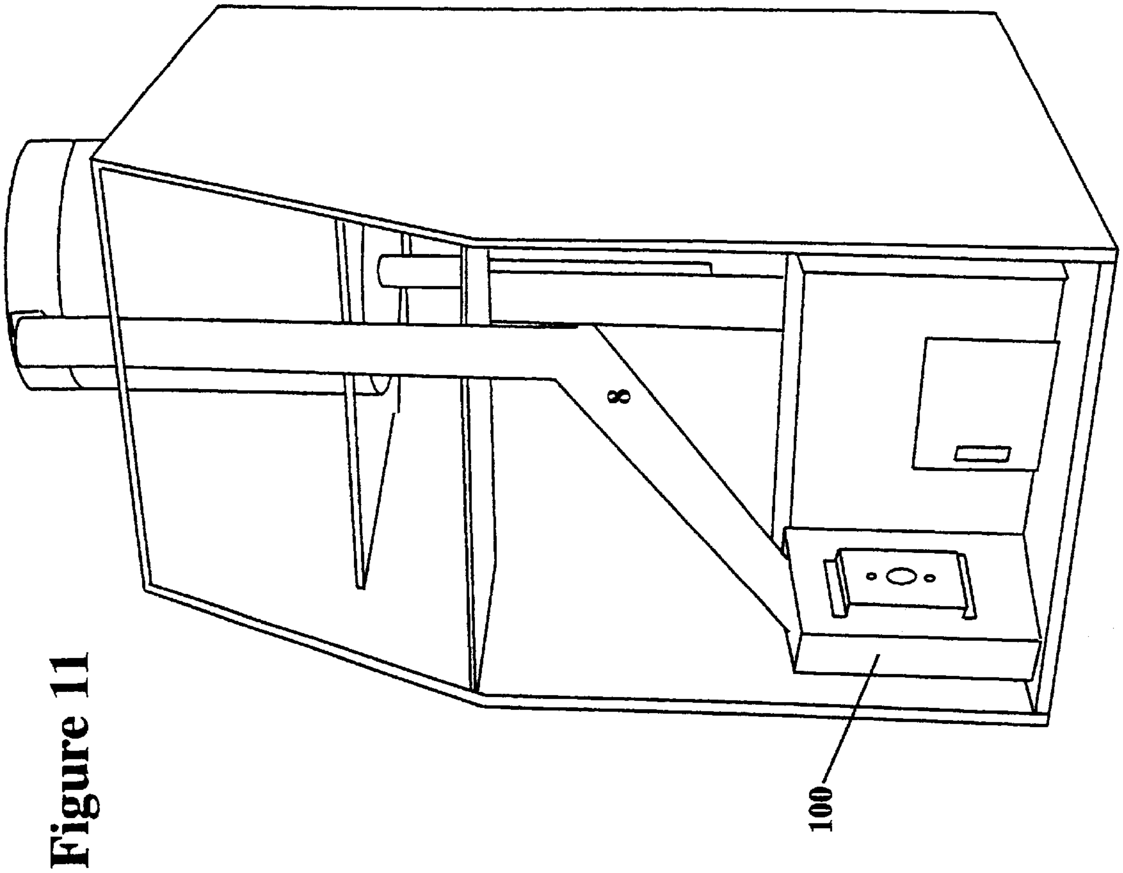
FIG. 11 is a front view of the pill dispenser illustrating an alternative pill directing mechanism.
Figures 12, 12A, 12B, 12C:
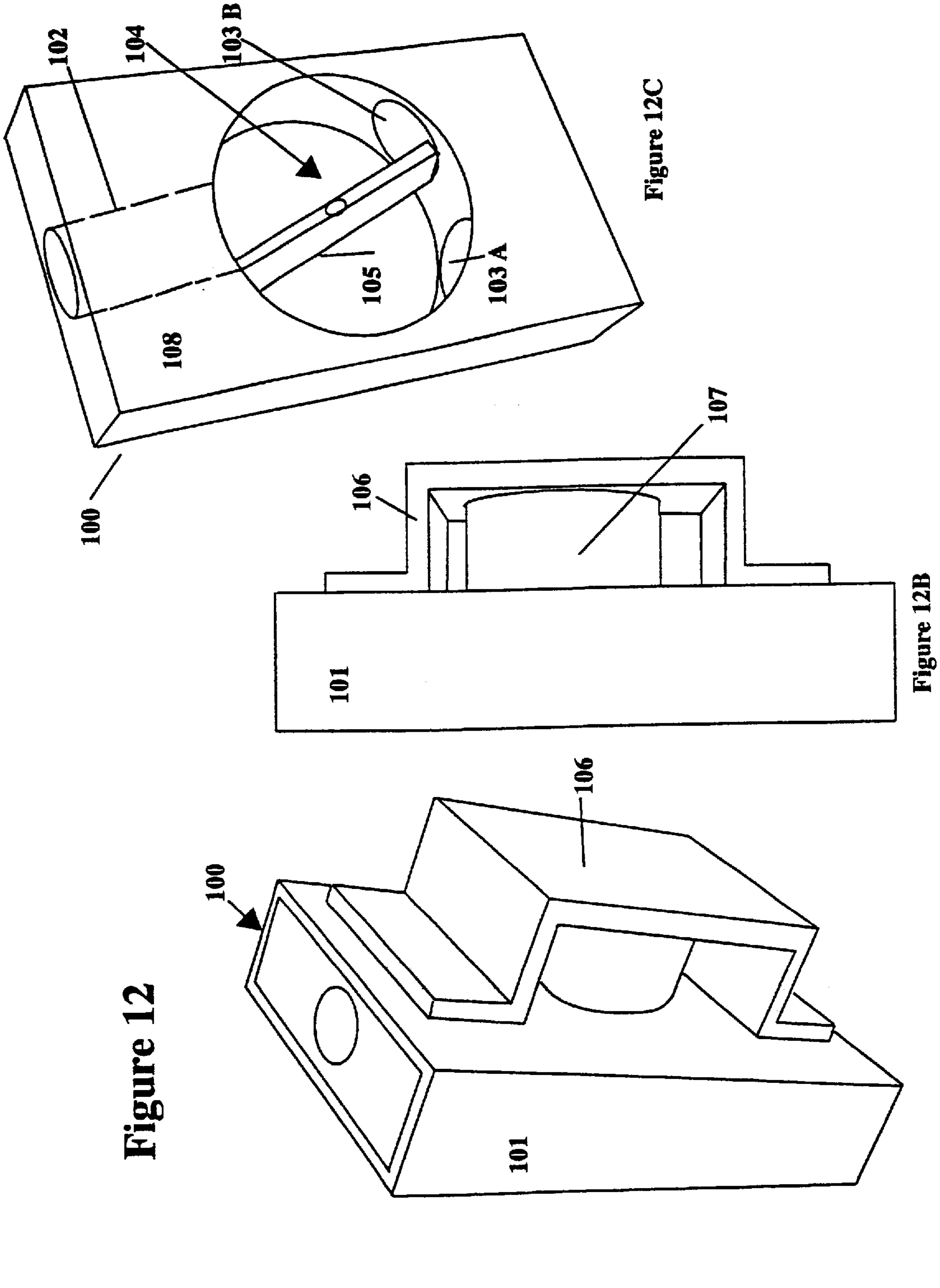
FIGS. 12*a*–12*c* are detailed views of the pill directing mechanism in FIG. 11.
Figure 15:
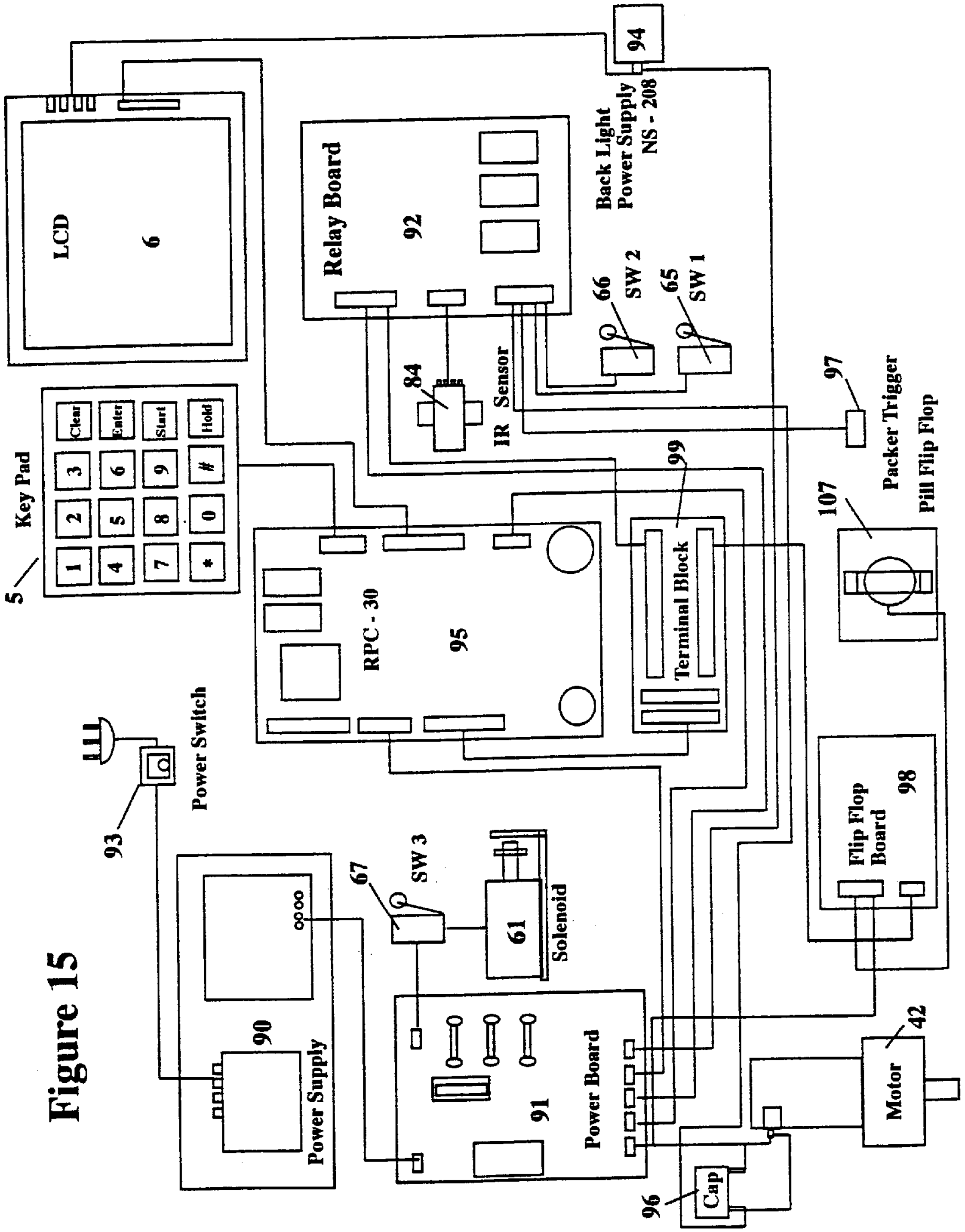
FIG. 15 illustrates the modifications to the control electronics schematic needed to carry out the alternative embodiment of FIG. 11.

FIGS. 11, 12 and 15 disclose minor modifications to pill dispenser 1 which allows it to operate in conjunction with sealers such as the Odessa Packaging Model 14. FIG. 11 shows how pill tube 8 will terminate into a flip-flop drop chamber 100. FIGS. 12*a* through 12*c* illustrate how flip-flop drop chamber 100 differs from the drop chamber 9 seen in FIG. 3. Brace 106 will secure a rotating solenoid 107 onto the housing 101 of drop chamber 100. A block 108 (FIG. 12*c*) slides within housing 101 and contains entrance passage 102, flipper device 105, and two exit passages 103*a* and 103*b*. Rotating solenoid 107 is connected to the flipper device 105 and will operate by rotating flipper device 105 in one of two positions. The first position of flipper device 105 is seen in FIG. 12*c* and shows how a pill passing down entrance passage 102 will be directed down exit passage 103*b*. When in the second position, flipper device 105 will be rotated clockwise such that a pill traveling down entrance passage 102 will be directed to exit passage 13*a*.

Figures 13, 13A, 13B, 13C:
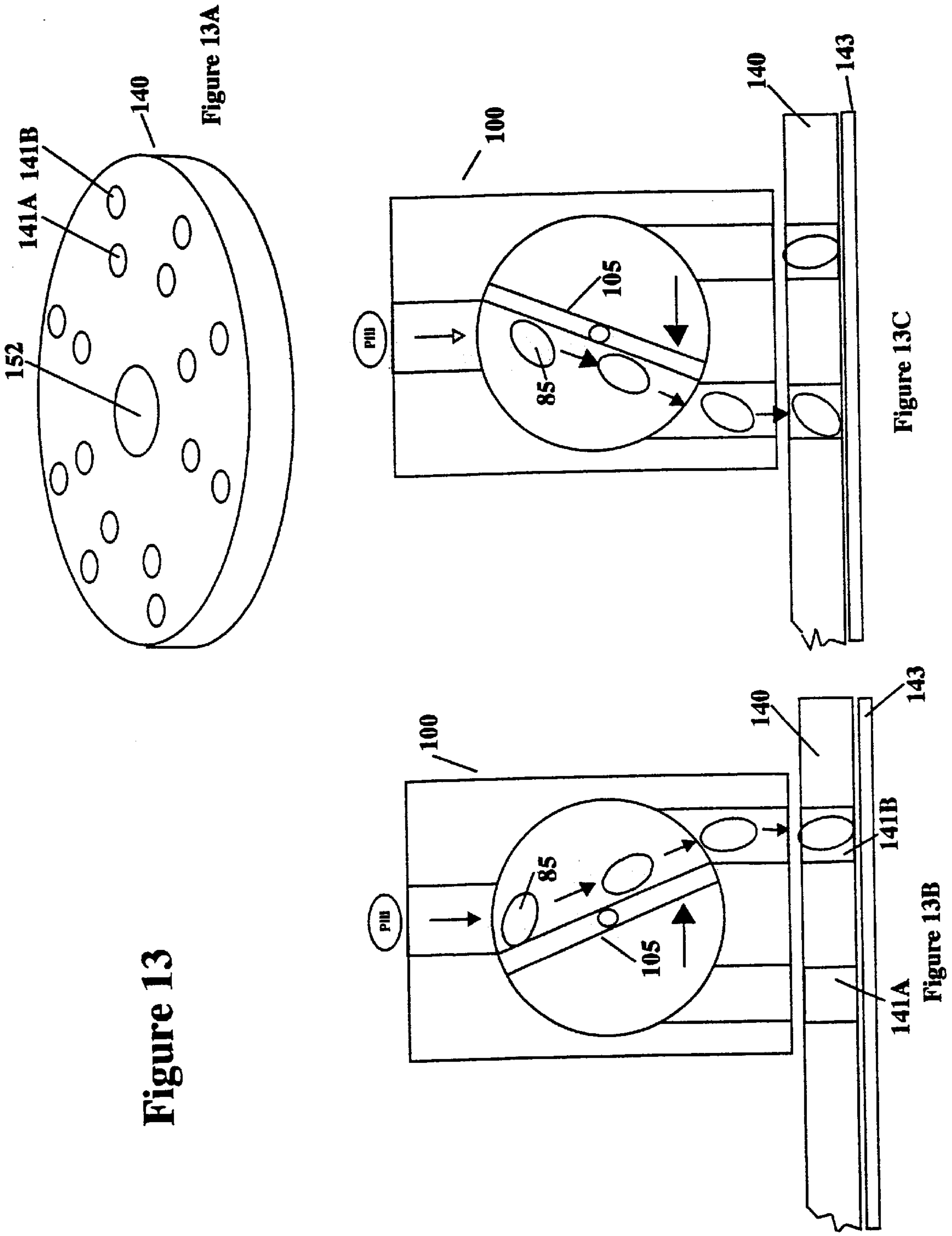
FIGS. 13*a*–13*c* illustrates the pill dispenser of FIG. 11 interfacing with part of a conventional sealer.
Figures 14, 14A, 14B, 14C:
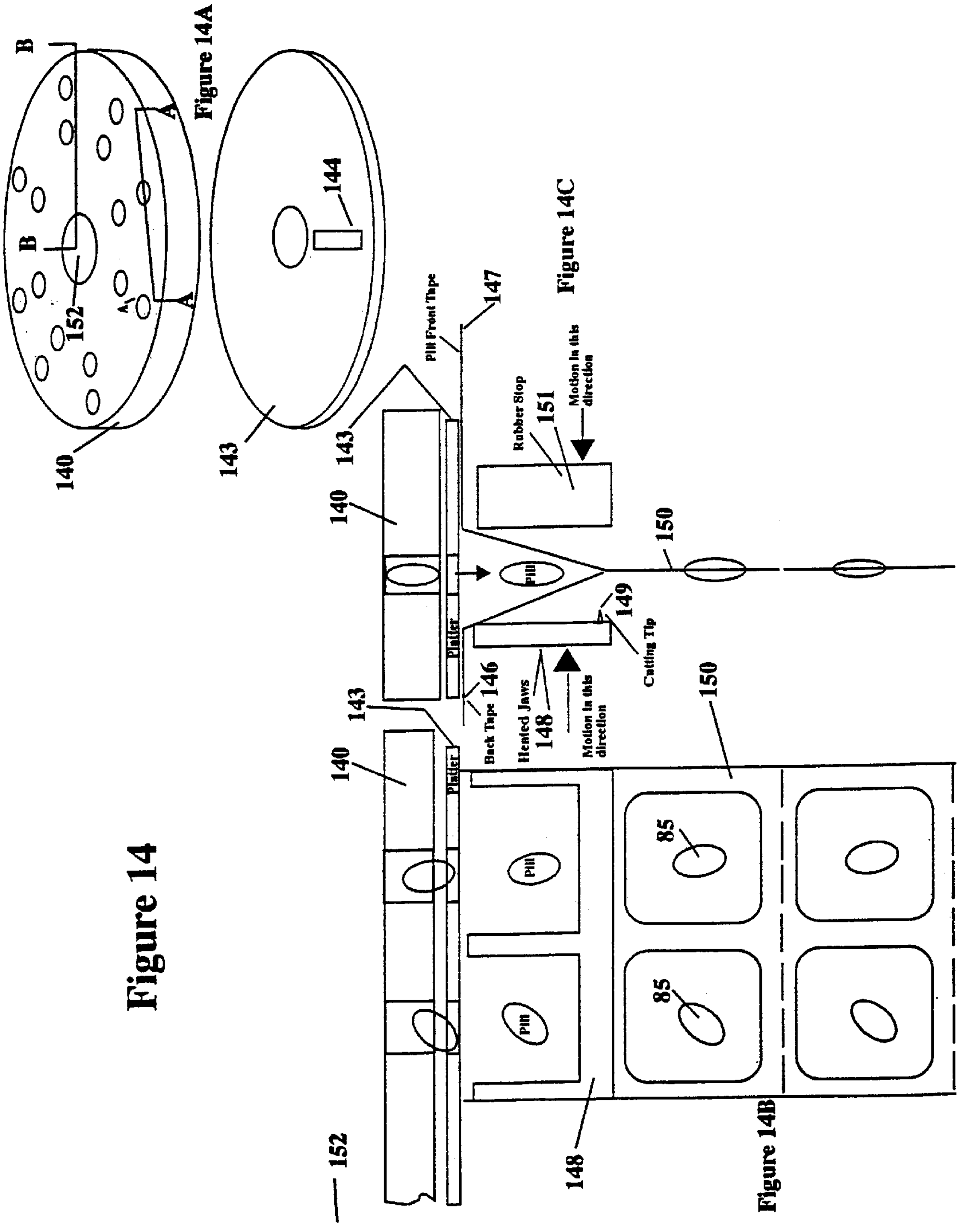
FIGS. 14*a*–14*c* show additional details of a conventional sealer.

FIGS. 13 and 14 illustrate how drop chamber 100 of dispenser 1 will interface with the sealer. FIG. 13*a* shows the sealer's rotating disk 140 which has a bearing aperture 152 which will be connected to the shaft on the sealer (not shown) in order to selectively rotate disk 140. Disk 140 will include multiple sets of apertures 141*a* and 141*b* for receiving pills 85. As seen in FIG. 13*b*, disk 140 of the sealer will be positioned just below drop chamber 100. This allows flipper 105 to direct a pill into aperture 141*b* and then for flipper 105 to rotate (FIG. 13*c*) and direct a second pill into aperture 141*a*. FIGS. 14 show more detail regarding a sealer such as the Odessa Packaging model 14. FIGS. 14*a* illustrates a pill platter 143 with a slot 144 and FIGS. 14*b* and 14*c* show how pill platter 143 will operate in conjunction with disk 140. FIG. 14*b* is a side view of the pill tape package 150 which will enclose pills 85. FIG. 14*b* shows disk 140 cut along the line BB seen in FIG. 14*a*. FIG. 14*c* shows an end view of the sealer to illustrate the component parts of tape package 150 and heated jaw 148 which will seal the tape package 150. FIG. 14*c* shows disk 140 cut along line AA seen in FIG. 14*a*. FIG. 14*c* also illustrates how tape package 150 comprise to lines of continuous tape, back tape 146 and front tape 147. A pill will fall between back tape 146 and front tape 147 and then heated jaw 148 will press these sections of tape against a rubber stop 151. Heated jaw 148 will seal front tape 147 and back tape 146 together to form pill package 150. It will be understood that cutter tip 149 simultaneously cuts a series of perforations in beneath pill 85 as is well known in the art. The side view of FIG. 14*b* generally shows the shape of heated jaw 148 and how it will separately seal two pills 85. It will be noticed in FIG. 13*c* that when pills 85 are deposited into apertures 141*a* and 141*b*, those apertures are not aligned with slot 144 in platter 143. It is at a later stage as disk 140 continues to rotate a set of apertures 141 containing pills line up with slot 144 and deposit the pills between back tape 146 and front tape 147. It will be readily apparent how the foregoing describes an automated process producing a continuous tape of pills in packages 150.

FIG. 15 illustrates how the circuit diagram may be modified to accommodate flip-flop drop chamber 100. These modifications will include adding flip-flop board 98 which receives activating signals from microprocessor 95. Flip flop board 98 will in turn transmit power from power board 91 to rotating solenoid 107 when microprocessor 95 provides the signal to do so. It can be seen how solenoid 107 and flipper device 105 act as a pill direction selector, selecting which passage (103*a* or 103*b*) the pill will travel down. Flip flop board 98 may also contain logic circuitry which notes the rotation of rotating solenoid 107 and sends the sealer a signal to advance the next pill package and rotate disk 140 (FIG. 14*b*) based on that signal. Naturally, the signal to advance the pill package could also be sent by microprocessor 95. It will be understood that minor modifications to the flowchart of FIG. 10 may be required when implementing the embodiment of FIGS. 11–13. However, such modifications are well within the ability of those skilled in the art. Additionally, appendix Al attached hereto contains the microprocessor code for the functions seen in FIG. 10 and appendix A2 contains the modified code for those functions described in reference to FIGS. 11–13.

Although certain preferred embodiments have been described above, it will be appreciated by those skilled in the art to which the present invention pertains that modifications, changes, and improvements may be made without departing from the spirit of the invention defined by the claims. All such modifications, changes, and improvements are intended to come within the scope of the present invention.

We claim:

1. A pill dispensing system, comprising:

a. a container constructed to hold a plurality of pills, said container including a lower aperture and an upper portion;

b. a pill lifting assembly engagable with said lower aperture, wherein said pill lifting assembly includes a pill platform lifting a pill into said upper portion of said container;

c. a pill ejector connected to said pill platform, said pill ejector placing said pill into motion as said pill platform approaches said upper portion of said container;

d. an exit passage communicating with said upper portion and being configured to receive a pill placed into motion by said ejector;

e. a sensor operatively connected to said exit passage such that said sensor is capable of detecting a pill moving through said passage; and f. a micro-controller operatively connected to said pill lifting assembly and said sensor, said micro-controller accepting an input representing the number of pills to be dispensed and initiating sufficient cycles of said pill lifting assembly to insure said number of pills is dispensed.

2. The pill dispensing system of claim 1, wherein said pill platform includes a cup adapted to retain a single pill on said platform.

3. The pill dispensing system of claim 1, wherein said container includes a pill hopper with an inclined surface directing pills toward said lower aperture.

4. The pill dispensing system of claim 1, wherein a pill sweep is operatively connected to said upper portion of said container such that said pill sweep insures that only a single pill is positioned on said pill platform.

5. The pill dispensing system of claim 4, wherein said pill sweep further comprises an air tube adapted to supply a flow of compressed air across said pill platform.

6. The pill dispensing system of claim 5, wherein said pill sweep further comprises a pneumatic pump for delivering said compressed air to said air tube.

7. The pill dispensing system of claim 1, wherein said pill lifting assembly comprises:

a. a support frame;

b. a worm drive having a motor which is activated by said micro-controller; and c. a worm block threadably engaged with said worm drive, wherein said support platform is attached to said worm block.

8. The pill dispensing system of claim 1, wherein said container further includes a pill agitator for agitating pills contained therein.

9. The pill dispensing system of claim 8, wherein said pill agitator comprises an agitator arm connected to a solenoid device and said solenoid device is activated by said micro-controller.

10. The pill dispensing system of claim 1, wherein said pill ejector comprises a first magnet which is placed in motion when said first magnet moves adjacent to a second magnet positioned in said upper portion of said container.

11. The pill dispensing system of claim 10, wherein said first magnet is connected to a pill plunger which accelerates said pill into motion.

12. The pill dispensing system of claim 1, wherein said exit passage includes an elongated pill tube and a direction selector at the end of said tube which controls alternative routes a pill may travel.

13. The pill dispensing system of claim 12, wherein said direction selector is a rotating surface capable of guiding a pill in one of at least two possible routes.

14. The pill dispensing system of claim 1, wherein said pill lifting assembly is powered by a motor with limit switches for reversing the direction of said motor when said lifting assembly approaches upward and downward limits of travel.

15. The pill dispensing system according to claim 1, wherein said pill container is fixed and said pill platform moves up and down within said pill container.

* * * * *